United States Patent Office.

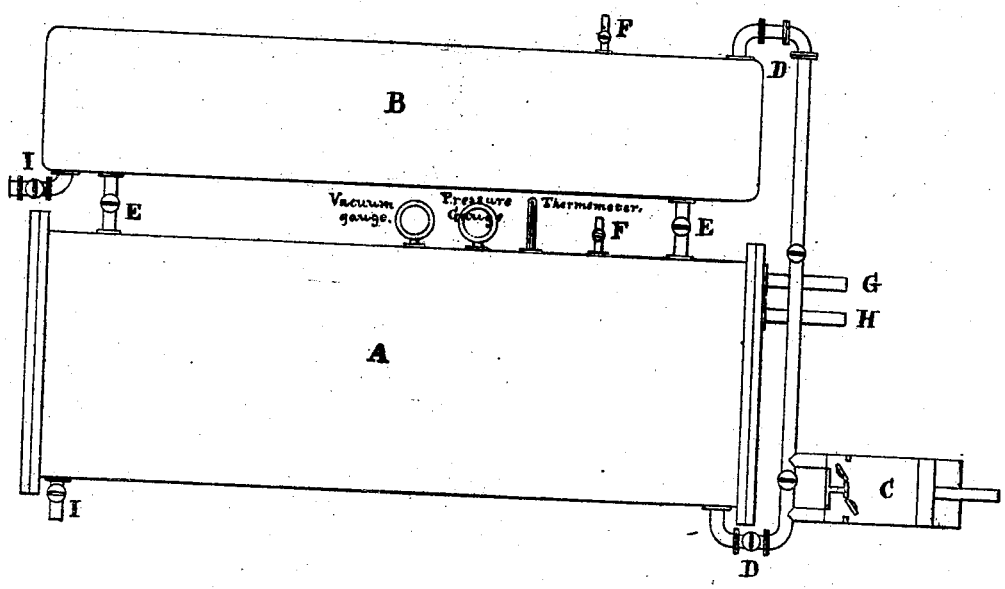

HERMAN HAUPT, OF PHILADELPHIA, PENNSYLVANIA.

*Letters Patent No. 99,186, dated January 25, 1870.*

IMPROVEMENT IN DRYING, PRESERVING, AND COLORING WOOD OR OTHER FIBROUS MATERIAL.

The Schedule referred to in these Letters Patent and making part of the same.

*To whom it may concern:*

Be it known that I, HERMAN HAUPT, of city and county of Philadelphia, in the State of Pennsylvania, have invented certain new and useful Improvements in Process for Drying, Preserving, and Coloring Wood or other Fibrous Materials; and that the following is a full, clear, and exact description of the same, reference being had to the accompanying drawing, which represents an elevation of the apparatus used in connection with this, my invention.

Numerous attempts have heretofore been made to expel moisture from wood, for drying, or preliminarily to its immersion in or absorption of the preservative ingredients or other substances; but none of them have been successful, owing to an apparent disregard of the physical laws which control such processes.

It is an axiom that two substances cannot occupy the same space at the same time; yet attempts have been made to introduce solutions or vapors into wood while the cells are saturated with water. According to other processes, the necessity of removing the water has been recognized, and the wood was, consequently, confined in close vessels, and heat applied; but the escaping moisture from the exterior cells would form an atmosphere of vapor at high tension, which, by its pressure on all sides, would render the escape of water from the interior cells impossible. This was partly remedied by creating a vacuum in the tank containing the wood to be operated on, by exhausting the air therefrom, and by application of heat. This proved, in practice, of no avail, since the escaping vapors vitiated the vacuum long before the expulsion of the water was completed.

Wood, as is well known, is an exceedingly imperfect conductor of heat. A very great length of time is required to heat a stick of wood to the interior; and, even were it possible to communicate a temperature of 212° to the entire stick, the conversion of each cubic inch of water into steam would render latent a sufficient amount of heat to lower the temperature of five and a half cubic inches from the boiling to the freezing-point. Consequently, the heat would all be dissipated by such rapid evaporation, and the temperature reduced below the point of volatilization long before any considerable portion of the water in the interior cells could be converted into vapor, and expelled.

Attempts have been made to saturate timber by boiling in oil, and with entire success; but saturation is not desirable. Wood will absorb its own weight and bulk of oil, and the process is not only too expensive, but it renders the wood, for many purposes, entirely unsuitable, and exceedingly combustible. Possibly less than one per cent. of the amount necessary for saturation would preserve wood effectually with carbolic acid and other coal-tar products, if the process were such as to insure actual penetration to the interior of all the cells. It is well known that dry wood contains only four per cent. of soluble matter liable to decomposition, and that one-thousandth part of carbolic acid will preserve such matter as urine, fæces, glue-solution, piste, &c., from putrefaction.

Vapor processes must prove unsuccessful, for reasons that are very obvious. Neither vapors nor solutions can penetrate the cells of wood which are already filled with water, and no process has yet been prepared for the removal of water from green wood which fulfils the conditions essential to success. In the next place, carbolic acid and other of the most valuable products of the distillation of coal-oils boil at temperatures near 400°, and condense into liquids, if the temperature falls below the boiling-point, in which regard they are extremely sensitive, so that, to maintain such products in vapor long enough to enable them to penetrate the wood, the tank and the material must be heated nearly to 400°; and, if water is present, as it always must be, it would be converted into high steam, at a pressure of about two hundred pounds to the inch. As a consequence, tanks of large diameter would be exploded, and small tanks are practically useless, being only fit to prepare samples for exhibition. A heat of 400°, moreover, would render wood scorched and brittle.

I will now proceed to describe the process by which green wood can be effectually relieved of water, and permeated with the oils of coal-tar, as this will present the most difficult case of treatment; and the dead oil from the distillation of coal-tar, while it is the best, is also the cheapest material that can be used.

The wood being placed in the tank A through a door in the end, steam is admitted by the pipe G, connected with a boiler. The first operation is to open the air-cock F, and let the air blow off. The cock is then closed, and the wood remains surrounded by a bath of steam, until it is heated to a proper degree, but not necessarily to the middle. As wood is a very imperfect conductor, and the penetration of the heat is resisted by the water in the cells, a very long time would be required to reach the middle portions of a large stick. When the exterior portions are sufficiently heated, the steam is condensed by a jet of water, which removes the pressure from the outside of the timber, and allows the contained water from the interior rows of cells to resolve itself rapidly into vapor, and escape into the tank. But, in this conversion of water into vapor, a large amount of heat, as previously stated, becomes latent, which is taken from adjacent portions, and cools them rapidly below the point of vaporization. The wood must, therefore, again be heated, by turning on the steam a second time; but now a partial vacuum in the exterior cells facilitates its entrance. It penetrates and heats to a greater depth than before, a vacuum is again formed, and the operation repeated at intervals, until the water is all converted into vapor, and expelled. The length of time required for this operation will depend on the size of the timbers and the state of seasoning, and must be determined by observation.

After the removal of all the water from the cells, and the creation of a vacuum by condensation of the surrounding steam, the permeating-fluid contained in the upper tank B is allowed to flow in by opening the cocks E E. The fluid will flow without opening the air-cock F on the upper tank; but this can be done, if pressure is required. It is not desirable, however, to allow the fluid to remain long in the lower tank, as too great saturation is objectionable. All that is desired is a minute portion of the carbolic acid or other preservative material; but the process must be such as to insure, beyond doubt or possibility of failure, the actual permeation of the substance into the cells. In other words, it is not quantity of material, but certainty of application that is required. When a sufficient amount has been taken up, the steam is again admitted, and the fluid driven into the upper tank by the pressure of steam on its surface. The same pressure also drives the fluid which has been absorbed in the bath into the pores of the wood, where there is no longer water to oppose its entrance, but a vacuum, more or less complete, prepared to receive it.

In this process, it is not necessary that the heat should be carried above 212° to insure a sufficient permeation of the fibre with carbolic acid; consequently, there is no danger of destroying the elasticity of the material by heat, or of explosion, and tanks can be made of large capacity. In the vapor process, without a fluid bath, no considerable quantity of carbolic acid can be introduced, unless the temperature of the tank is raised to nearly or quite 400°, which, if it did not cause an explosion, would injure the strength and elasticity of the material, scorching it, and rendering it brittle.

If solids are to be introduced, they must first be liquefied by heat, which may be effected by coils of steam-pipe, or in any other convenient way.

If the process is to be applied to drying or coloring, and the material is too delicate to permit the use of steam in the tank, the fluid can be transferred from the lower to the upper tank, and a vacuum created by the pump C. This will form an almost perfect vacuum, while an air-pump would form only a very imperfect one, and, when the coloring-fluid was returned to the lower tank, it would penetrate to the interior of the fibres, which action could be assisted, if necessary, by the application of pressure.

Having described my invention,

What I claim as new, and desire to secure by Letters Patent, is—

1. Drying wood and other fibrous material, or impregnating the same with preservative or coloring-substances, by the process and means substantially as herein described.

2. The method of drying wood, or other vegetable substance of cellular structure, by two or more successive applications of steam or other heated vapor, followed, each, by condensation, producing a vacuum more or less perfect, substantially as set forth.

3. The combination of the hereinbefore-described process, of drying wood and other vegetable substances of cellular structure, with the process, herein set forth, of impregnating said substances with and by immersion in coloring or preservative matters.

4. The combination of the drying and impregnating-processes herein described, when the impregnation is effected under pressure.

In testimony whereof, I have signed my name to this specification, before two subscribing witnesses.

HERMAN HAUPT.

Witnesses:
A. POLLOK,
WM. H. McCABE.